Patented Mar. 29, 1938

2,112,717

UNITED STATES PATENT OFFICE 2,112,717

HOLLOW ARTICLE

James E. Snyder, Lynbrook, N. Y., assignor, by mesne assignments, to E. I. du Pont de Nemours & Company, Wilmington, Del., a corporation of Delaware No Drawing. Application August 7, 1935, Serial No. 35,164

5 Claims. (Cl. 18—57)

This invention relates to the production of hollow, non-fibrous pellicles capable of use as sealing closures for containers and the like. More particularly, the invention relates to the production of such pellicles from resinous materials such as polymerized derivatives of acrylic acid.

Hollow articles such as caps and bands are extensively used as closures for bottles and the like. They are customarily applied in the water-wet state over primary closures such as corks, metal caps, screw caps whether of metal or synthetic resin, and the like. These caps and bands shrink as the result of the evaporation of their contained water so that they tightly grip the primary closures. They form attractive decorations and serve to lessen somewhat the danger of tampering with, and adulteration of the material within, the bottle.

Hitherto, these caps have been formed of regenerated cellulose, gelatin or casein. The principal difficulty with these materials is that when they are shrunk into place over the primary closure, they can be removed by soaking in water, which causes them to swell sufficiently so that they can be slipped off without damage. As a result, the protection against tampering is not as good as desired.

It has now been found, in accordance with this invention, that certain types of synthetic resins dissolved in suitable water-soluble solvents will set up, upon precipitation with water, to pellicles which will harden as the result of the loss of their contained liquid and which will not reswell to any substantial degree upon subsequent rewetting with water.

One object of this invention is therefore to prepare hollow articles which can be formed to shape and which will harden upon removal of their contained liquid. A further object relates to the production of hollow pellicles which will not reswell to any substantial degree upon rewetting. Other objects of the invention will appear hereinafter.

The objects of the invention can be achieved, in general, by preparing a solution of a suitable synthetic resin, precipitating the resin from the solution in the form of a hollow pellicle, placing and shaping the pellicle over the top of a container and permitting the same to set in place thereon by removal of the contained liquid as by evaporation.

Synthetic resins found to be suitable in the practice of the present invention are polymers derived from acrylic acid. The monomers from which the polymers are obtained may be esters of acrylic acid, but are preferably esters of substituted acrylic acid. It is to be understood for the purposes of this invention that substituted acrylic acids contain the substituent on the alpha carbon atom. Examples of such esters are methyl, ethyl, propyl, butyl, phenyl, methoxyethyl ($CH_3$—O—$CH_2CH_2$—) butoxyethoxyethyl ($C_4H_9$—O—$CH_2CH_2$—O—$CH_2CH_2$—)

esters. Examples of substituted acrylic acids, polymerized esters of which are included within the scope of the invention are methyl acrylic acid, ethyl acrylic acid, butyl acrylic acid and chloracrylic acid. Out of this class the most preferred type is the alkyl ester of alkyl acrylic acid such as methyl alpha methacrylate. Alkyl esters of acrylic acid, such as methyl acrylate, ethyl acrylate, etc. are also useful.

Various commercial resins coming within this classification are "Luglas" and "Alpha Flexigum" (resinous polymers of acrylic acid or of methyl acrylic acid made by the Rohm & Haas Company of Philadelphia, Pennsylvania) and "Acryloid" resin LB—10 (B—21A) (a resinous polymer of acrylic acid or of methyl acrylic acid made by the Resinous Products & Chemical Corporation of Philadelphia).

The following specific examples will illustrate certain preferred steps of procedure and particularly satisfactory materials to be used in carrying out the invention. It is to be understood, however, that the invention is not to be limited to the details set forth in these examples.

Example I

A solution containing 12% by weight of "Luglas" resin in acetone is poured into a small beaker so as to coat the wall surface of the beaker, the excess then being poured out. The beaker is then immersed in cold water, whereupon a cap is produced, superficially adherent to the walls of the beaker. The cap is removed with the fingers, drawn over a bottle, shaped to conform therewith and upon evaporation of its contained water and residual solvent will be found to provide a glass-clear, highly satisfactory, protective closure which cannot be removed by soaking in water.

Example II

A solution containing 15% by weight of "Alpha Flexigum" in acetone, to which 2.5% of dibutyl phthalate (based on the weight of the solution) is added, is formed into caps as in Example I, with similar results.

Example III

A resinous polymerized ester of methyl acrylic acid, dissolved in acetone to make a 20% solution, is used as in Example I, with similar results, the caps being slightly soft which may well be a favorable characteristic for certain uses.

Example IV

"Acryloid" resin LB—10 (B—21A), when dissolved in acetone to give a 12% solution, and used as in Example I gives the same good results.

Although polymerized derivates of acrylic acid are preferred, resinous polymerized esters of other alpha-beta unsaturated acids, e. g. crotonic acid, will be satisfactory. It will be evident, of course, that the properties of the resulting caps will depend in part on the particular resin employed and that a suitable one will be chosen for the purpose in hand. Thus, the resin made from methyl alpha methacrylate is hard and tough, whereas a resin made from butyl methacrylate is brittle and the one made from butoxyethoxyethyl

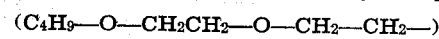

alpha methacrylate is soft and sticky.

The resinous polymerized esters should be dissolved in acetone or any other suitable water-soluble solvent such as is well known in the art.

It will be understood of course that while the examples are set forth in terms of forming a cap within a beaker, the structure can be formed in other ways as by dipping a test tube or other forming device into the solution of the resin, withdrawing and draining, and then dipping into the water as is the customary practice in the manufacture of bottle caps. I can as well extrude the solution continuously into the bath through an annular extruding device and form instead of bottle caps, a continuous length of seamless tubing which can be used for many purposes, such as bands, for protective closures.

As is indicated in Example II, it is sometimes desirable to incorporate in the solution a plasticizer in order to contribute to the final structure a more desirable characteristic. There are a number of plasticizers which are useful for this purose such as dibutyl phthalate, tricresyl phosphate and cyclohexyl phthalate, and others, for example, such as are set forth in the United States Patent No. 1,980,483, issued November 13, 1934.

In practice, these hollow articles, such as caps and bands, are sold in the original swollen condition, and packed in some suitable shipping solution. The solution may contain a suitable softener, and it may contain a preservative intended to prevent the structure from disintegrating due to its long storage in the shipping solution, and in the case of these caps and bands, it might well contain a material which will prevent the caps and bands from shrinking while stored in the solution, this being a peculiar property of these structures as distinguished from the regenerated cellulose structures on the market. I have found, for example, that I can prevent this incipient shrinkage by maintaining a suitable concentration of acetone in the shipping solution and I have found too that if some of the plasticizers mentioned above are introduced either into the casting solution or become absorbed into the structure from the shipping solution, the same result is attained.

It will be understood of course that other modifying agents may be employed to produce various effects. Thus, colored pigments or other materials may be incorporated in the compositions from which these structures are formed. The materials may be uniformly distributed throughout the entire areas of the structures or they may be preferentially distributed in order to give special effects.

Obviously many other changes and modifications can be made in the detailed description without departing from the nature and spirit of the invention. The invention is therefore not to be specifically limited except as set forth in the appended claims.

I claim:

1. As a new article of manufacture a hollow pellicle composed of a resinous, polymerized ester of an alpha-beta unsaturated acid, said pellicle being impregnated with a liquid comprising water and sufficient water-soluble solvent for said ester to prevent shrinkage of the pellicle prior to the removal of said liquid therefrom and being adapted to shrink as the result of the evaporation of its contained liquid.

2. As a new article of manufacture a hollow pellicle composed of a resinous, polymerized ester of an acrylic acid, said pellicle being impregnated with a liquid comprising water and sufficient water-soluble solvent for said ester to prevent shrinkage of the pellicle prior to the removal of said liquid therefrom and being adapted to shrink as the result of the evaporation of its contained liquid.

3. As a new article of manufacture a hollow pellicle composed of a resinous, polymerized ester of an alkyl acrylic acid, said pellicle being impregnated with a liquid comprising water and sufficient water-soluble solvent for said ester to prevent shrinkage of the pellicle prior to the removal of said liquid therefrom and being adapted to shrink as the result of the evaporation of its contained liquid.

4. As a new article of manufacture a hollow pellicle composed of a resinous, polymerized ester of a methacrylic acid, said pellicle being impregnated with a liquid comprising water and sufficient water-soluble solvent for said ester to prevent shrinkage of the pellicle prior to the removal of said liquid therefrom and being adapted to shrink as the result of the evaporation of its contained liquid.

5. As a new article of manufacture a hollow pellicle composed of polymerized methyl methacrylate, said pellicle being impregnated with a liquid comprising water and sufficient water-soluble solvent for said methyl methacrylate to prevent shrinkage of the pellicle prior to the removal of said liquid therefrom and being adapted to shrink as the result of the evaporation of its contained liquid.

JAMES E. SNYDER.